(12) United States Patent
Amakusa et al.

(10) Patent No.: US 6,513,619 B2
(45) Date of Patent: Feb. 4, 2003

(54) ELECTRICALLY-DRIVEN POWER STEERING SYSTEM

(75) Inventors: Hideki Amakusa, Toukai (JP); Atsushi Sato, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/928,365

(22) Filed: Aug. 14, 2001

(65) Prior Publication Data

US 2002/0023798 A1 Feb. 28, 2002

(30) Foreign Application Priority Data

Aug. 29, 2000 (JP) ........................................ 2000-258621

(51) Int. Cl.[7] ................................................ B62D 5/04
(52) U.S. Cl. ...................................... 180/404; 180/406
(58) Field of Search ................................ 180/404, 443, 180/446; 701/43

(56) References Cited

U.S. PATENT DOCUMENTS

| | | | |
|---|---|---|---|
| 4,799,566 A | * 1/1989 | Shimizu | ..................... 180/404 |
| 4,881,611 A | * 11/1989 | Nakashima et al. | ......... 180/404 |
| 6,032,756 A | 3/2000 | Nishimura et al. | |
| 6,148,949 A | * 11/2000 | Kobayashi et al. | ......... 180/404 |

* cited by examiner

*Primary Examiner*—Kevin Hurley
(74) *Attorney, Agent, or Firm*—Law Offices of David G. Posz

(57) ABSTRACT

An abnormality detection circuit for detecting abnormality of a CPU includes a command value check circuit for checking whether a current command value calculated by the CPU is normal or abnormal with respect to a torque signal, and a drive signal check circuit for checking whether a motor drive signal outputted based on the current command value is normal or abnormal. When the command value abnormality of the CPU is detected by the abnormality detection circuit, a counter circuit is started to count a time of an abnormality state of the CPU. If the counted time reaches a predetermined time, a control stop command is outputted from a system stop circuit to the CPU, thereby stopping the system control of the CPU.

3 Claims, 4 Drawing Sheets

ELECTRICALLY-DRIVEN POWER STEERING SYSTEM

CROSS REFERENCE TO RELATED APPLICATION

This application is based on and incorporates herein by reference Japanese Patent Application No. 2000-258621 filed on Aug. 29, 2000.

BACKGROUND OF THE INVENTION

1. Field of the Invention

The present invention relates to an electrically-driven power steering system for assisting a steering force of a steering wheel by using a motor.

2. Related Art

U.S. Pat. No. 6,032,756 (JP-A-9-315330) discloses a conventional electrically-driven power steering system, which includes an interlock means for permitting and forbidding a motor to rotate. In the conventional system, when a manipulating direction of a steering wheel is different from a driving direction of the motor in case of a failure of a central processing unit (CPU) for controlling the motor, the motor is forbidden to rotate by the interlock means.

In the above conventional system, although the CPU failure can be detected by the interlock means, it is hard to detect the CPU failure when the steering torque (torque sensor signal) enters a dead-zone of the interlock means where the motor is permitted to rotate.

SUMMARY OF THE INVENTION

The present invention has an object to provide an electrically-driven power steering system where a failure of a motor control unit, that is, abnormality in a command value of the CPU, can be surely detected.

In the present invention, an electrically-driven power steering system comprises a command value check circuit for checking whether the current command value calculated by the motor control unit is normal or abnormal with respect to a signal from a torque sensor, and a drive signal check circuit for checking whether the drive signal outputted from the motor control unit is normal or abnormal with respect to the current command value.

According to this construction, when the motor control unit fails, it can be checked whether its failure is an abnormality of the current command value or of the drive signal. The failure of the motor control unit can be surely detected by checking both of the current command value calculated in accordance with the steering torque and the drive signal set based on the current command value.

When the calculated current command value is within a suitable range, the command value check circuit determines the current command value to be normal with respect to the signal from the torque sensor. When the current command value is outside the suitable range, the command value check circuit determines the current command value to be abnormal. In the same manner, the drive signal check circuit determines the drive signal to be normal with respect to the calculated current command value when the drive signal is within a suitable rage, and to be abnormal when the drive signal is outside the suitable range.

The electrically-driven power steering system further comprises a system stop circuit for stopping any one of the motor control unit and the motor drive circuit, when the current command value or the drive signal is determined to be abnormal by the command value check circuit and the abnormality state continues for a predetermined time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Next, an embodiment of the present invention will be described with reference to drawings.

Figure 1:
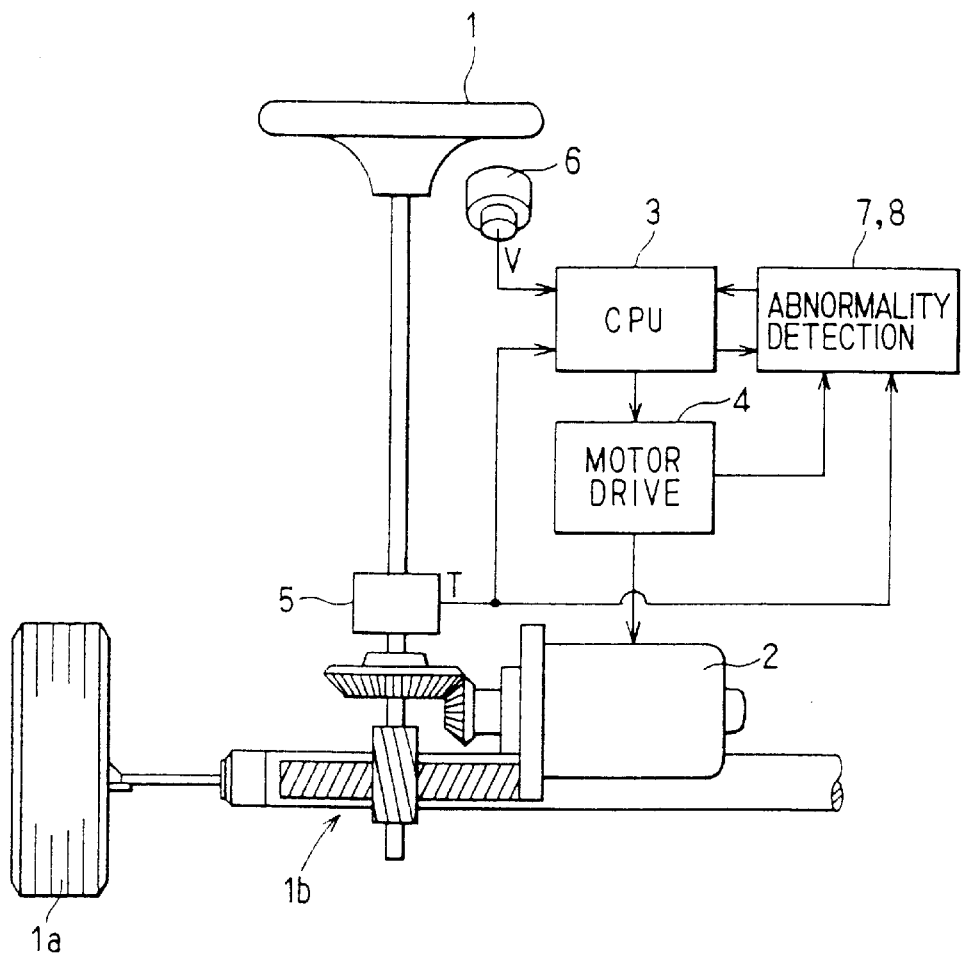
FIG. 1 is a schematic view showing an electrically-driven power steering system according to an embodiment of the present invention.
Figure 2:
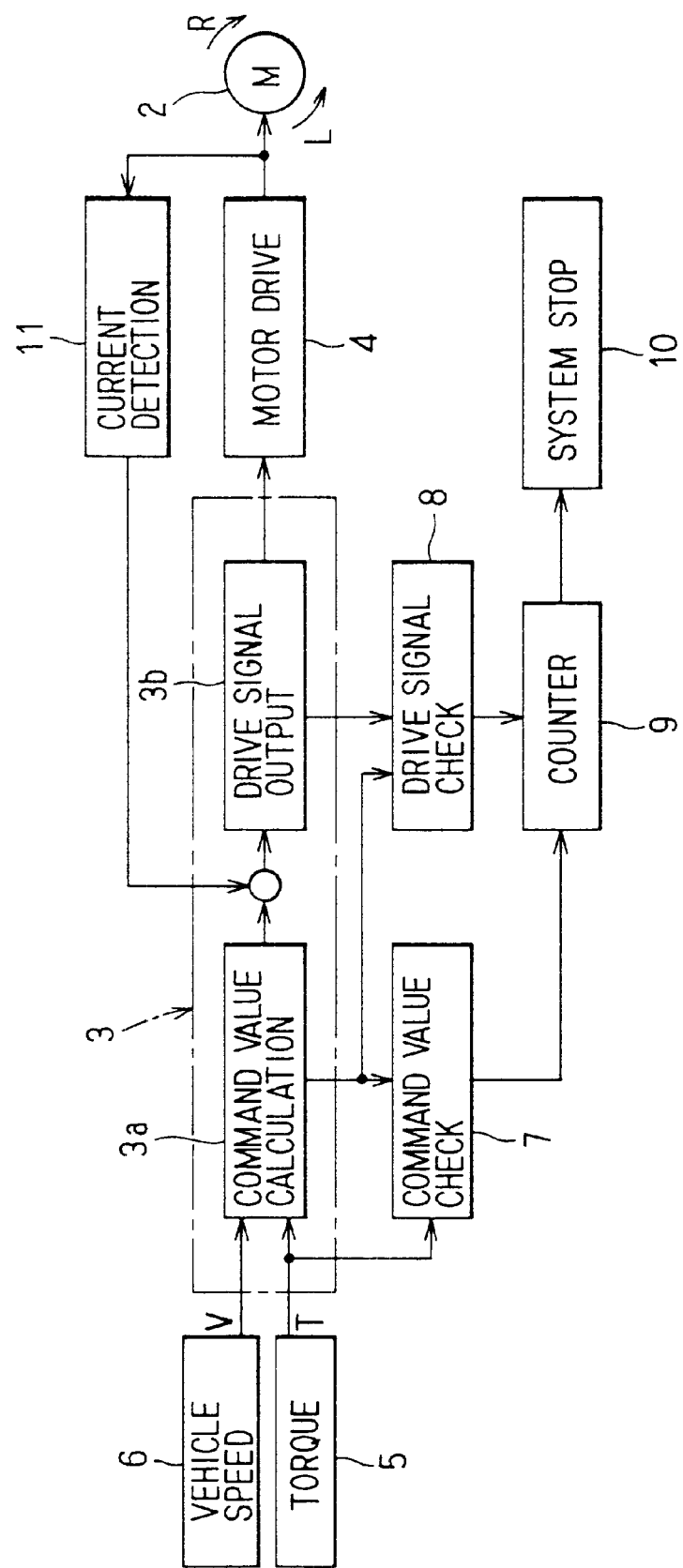
FIG. 2 is a block diagram showing the electrically-driven power steering system shown in FIG. 1.

Referring to FIG. 1 and FIG. 2, an electrically-driven power steering system according to the present embodiment is for steering vehicle wheels 1a by a steering wheel 1 through a steering mechanism 1b. It includes a motor 2 for assisting a steering force of the steering wheel 1, a motor control unit including a CPU 3 for controlling an operation of the motor 2, and an abnormality detection circuit (check circuits 7 and 8) for detecting an abnormality of the CPU 3. The motor control unit includes the CPU 3, a motor drive circuit 4 and a current detection circuit 11 for a current feedback control. The motor drive circuit 4 is an H-type bridge circuit composed of, for example, four field effect transistors (FETs not shown), and drives the motor 2 in the rightward or leftward rotation directions with pulse-width-modulation (PWM) control in response to a motor drive signal outputted from the CPU 3.

The CPU 3 includes a command value calculation circuit 3a for calculating a current command value (assistance current value) used for driving the motor 2 based on a torque signal T from a torque sensor 5 and a speed signal V from a vehicle speed sensor 6, a drive signal output circuit 3b for outputting a motor drive signal based on the calculated current command value, and the like.

The abnormality detection circuit includes a command value check circuit 7 (FIG. 3) for checking whether the current command value calculated by the CPU 3 is normal or abnormal with respect to the torque signal T, and a drive signal check circuit 8 (FIG. 6) for checking whether the motor drive signal outputted based on the current command value calculated by the CPU 3 is normal or abnormal. It also includes a counter circuit 9 for counting an abnormality-state time having elapsed since abnormality determination of either of the command value check circuit 7 and the drive signal check circuit 8, a system stop circuit 10 for stopping a control of the present system when the abnormality-state time continues for a predetermined time, and the like.

Next, a description will be made on a method how the abnormality of the CPU 3 is detected by the abnormality detection circuit.

Figure 3:
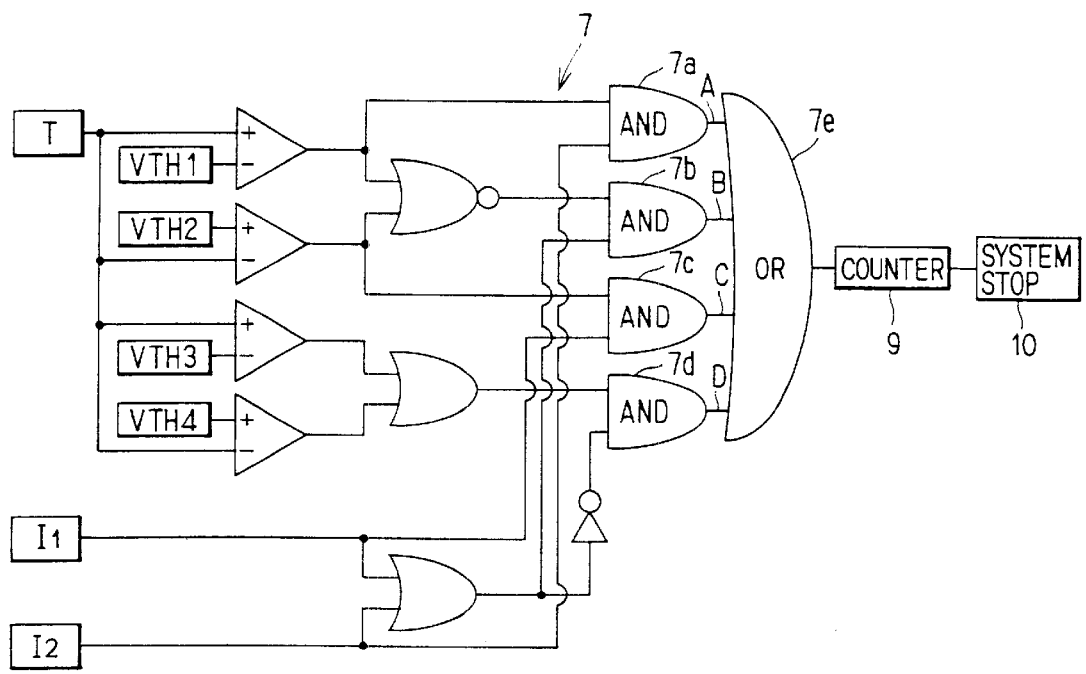
FIG. 3 is a logic circuit diagram showing a command value check circuit in the embodiment.
Figure 4:
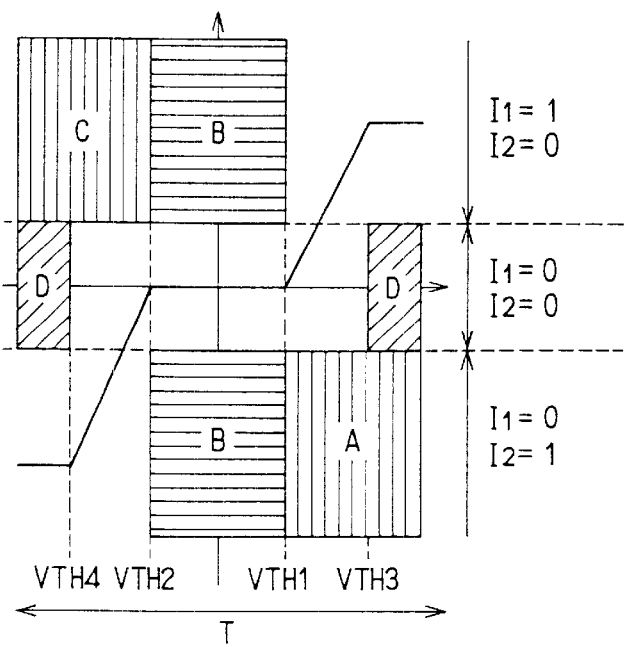
FIG. 4 is a graphical representation showing an abnormality range defined by a command value check circuit in the embodiment.

(1) Detection of an abnormality of current command value using the command value check circuit 7:

The command value check circuit 7, composed of logic circuits shown in FIG. 3, determines the current command value to be abnormal when output of these logic circuits enters an abnormality range (A, B, C, D) shown in FIG. 4, and operates the counter circuit 9.

Figure 5:
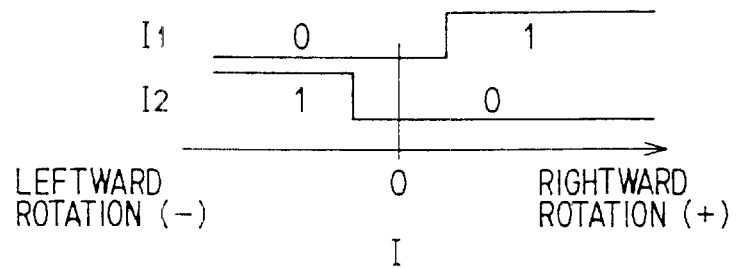
FIG. 5 is a graphical representation showing a relationship between a calculation value of a CPU and output values thereof.

Here, current command values I1, I2 are respectively outputted with respect to the current command value calculated by the CPU 3 as shown in FIG. 5. The current values are reversed between "0" and "1" to change the direction of rotation of the motor 2.

Next, a description will be made on a case that output of the logic circuits enters the abnormality range in FIG. 4.

(Range A) When a signal level from the torque sensor 5 is equal to or higher than VTH1, the current command value I2 is equal to "1" and the current command value I1 is equal to "0", the current command value is determined to be abnormal by an AND circuit 7a and an OR circuit 7e in FIG. 3.

(Range B) When a signal level from the torque sensor 5 is equal to or higher than VTH2 and equal to or less than VTH1, and either of the current command values I1, I2 is equal to "1", the current command value is determined to be abnormal by an AND circuit 7b and the OR circuit 7e in FIG. 3.

(Range C) When a signal level from the torque sensor 5 is equal to or less than VTH2, the current command value I1 is equal to "1" and the current command value I2 is equal to "0", the current command value is determined to be abnormal by an AND circuit 7c and the OR circuit 7c in FIG. 3.

(Range D) When a signal level from the torque sensor 5 is equal to or higher than VTH3 or equal to or less than VTH4, and both the current command values I1, I2 are equal to "0", the current command value is determined to be abnormal by an AND circuit 7d and the OR circuit 7e in FIG. 3.

Figure 6:
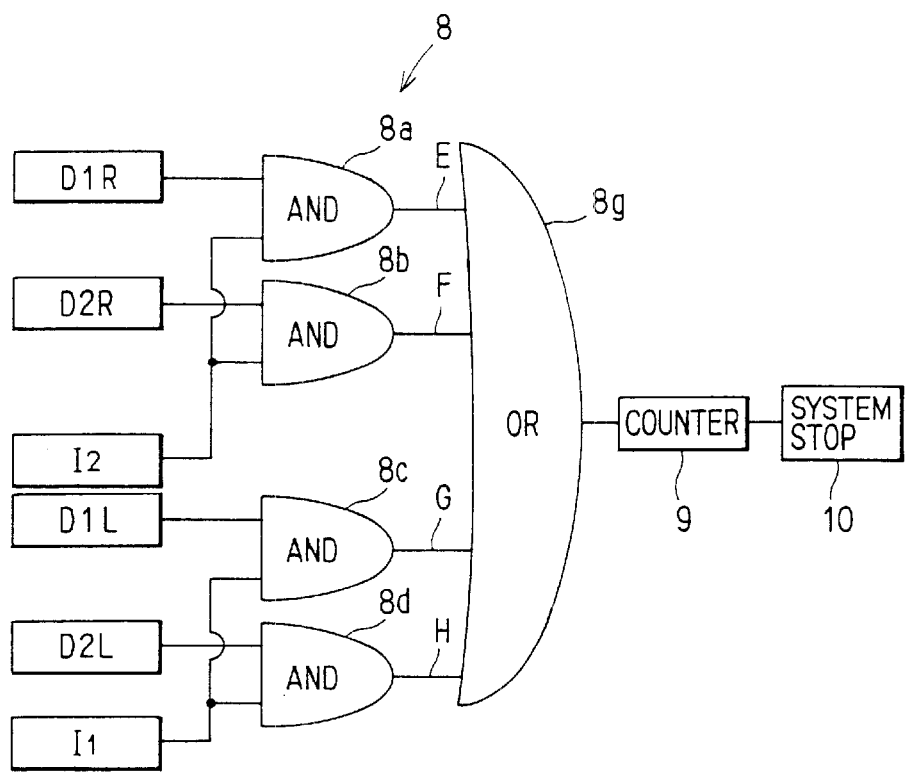
FIG. 6 is a logic circuit diagram showing a drive signal check circuit in the embodiment.
Figure 7:
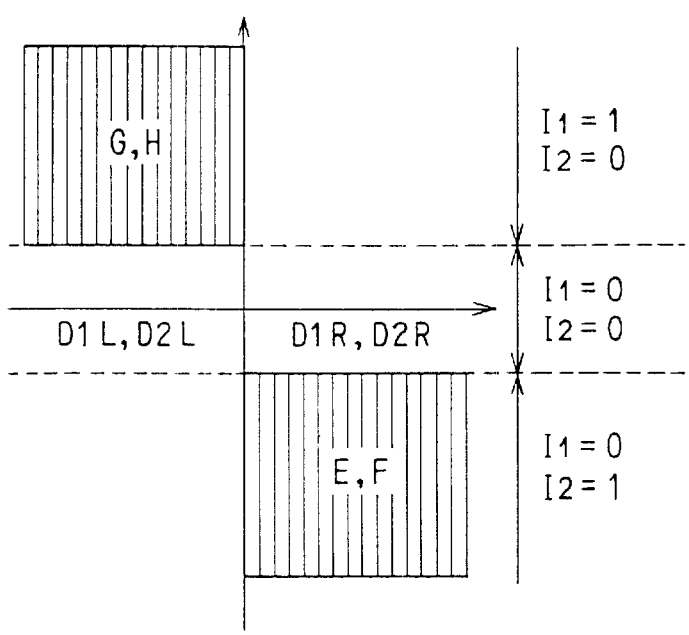
FIG. 7 is a graphical representation showing an abnormality range defined by a drive signal check circuit in the embodiment.

(2) Detection of an abnormality of drive signal using the drive signal check circuit 8:

The drive signal check circuit 8, composed of logic circuits shown in FIG. 6, determines the drive signal to be abnormal when output of these logic circuits enters an abnormality range (E, F, G, H) shown in FIG. 7, and operates the counter circuit 9.

Here, the current command values I1, I2 are respectively outputted with respect to the current command value calculated by the CPU 3 as shown in FIG. 5. Further, as shown in FIG. 6, the current command value I2 is inputted into the AND circuits 8a, 8b, and the current command value I1 is inputted into the AND circuits 8c, 8c.

Next, a description will be made on a case that output of the logic circuits enters the abnormality range in FIG. 7.

(Range E, F) When the current command value I1 is equal to "0" and the current command value I2 is equal to "1" to indicate leftward rotation, if FET drive signals D1R, D2R ("1") for rightward rotation are produced, the drive signal is determined to be abnormal by AND circuits 8a, 8b and an OR circuit 8g in FIG. 6.

(Range G, H) When the current command value I1 is equal to "1" and the current command value I2 is equal to "0" to indicate the rightward rotation, if FET drive signals D1L, D2L ("1") are produced, the drive signals are determined to be abnormal by AND circuits 8c, 8d and the OR circuit 8g in FIG. 6.

When the command value abnormality of the CPU 3 is detected by the abnormality detection circuit (command value check circuit 7 and drive signal check circuit 8), the counter circuit 9 is started to count the abnormality-state time. After the timer circuit 9 counts the abnormality-state time for a predetermined time, a system stop command is outputted from the system stop circuit 10 to the CPU 3, and the system control of the CPU 3 is stopped.

The abnormality detection circuit can surely detect the failure of the CPU 3 (command value abnormality) by checking both of the current command value I1, I2 calculated by the CPU 3 and the motor drive signals D1R, D2R, D1L, D2L outputted based on the current command value.

Further, when the CPU 3 fails, it can be checked whether its failure is the abnormality of the current command value or the abnormality of the motor drive signal. When the abnormality state continues for the predetermined time, the system is stopped to ensure safety.

The present invention is not limited to the above embodiment, but may be implemented in many other ways without departing from the spirit of the invention.

What is claimed is:

1. An electrically-driven power steering system comprising:
    a motor for assisting a steering force of a steering wheel by supplying motive power to a steering mechanism of the steering wheel;
    a torque sensor for detecting a steering torque of the steering wheel;
    a motor drive circuit for driving the motor in response to a drive signal;
    a motor control unit for calculating a current command value for driving the motor in accordance with the steering torque detected by the torque sensor, the motor control unit outputting the drive signal to the motor drive circuit based on the current command value;
    a command value check circuit for checking whether the current command value is normal or abnormal with respect to a signal from the torque sensor; and
    a drive signal check circuit for checking whether the drive signal is normal or abnormal with respect to the current command value.

2. The electrically-driven power steering system according to claim 1, further comprising:
    a system stop circuit for stopping any one of the motor control unit and the motor drive circuit when the current command value is determined to be abnormal by the command value check circuit and the abnormality state continues for a predetermined time.

3. The electrically-driven power steering system according to claim 1, further comprising:
    a system stop circuit for stopping any one of the motor control unit and the motor drive circuit when the drive signal is determined to be abnormal by the drive signal check circuit and the abnormality state continues for a predetermined time.

* * * * *